(12) United States Patent
Shieh

(10) Patent No.: US 9,809,674 B2
(45) Date of Patent: Nov. 7, 2017

(54) HIGH FUNCTIONAL POLYESTER POLYOLS

(71) Applicant: Huntsman International LLC, The Woodlands, TX (US)

(72) Inventor: David J. Shieh, Sugarland, TX (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 125 days.

(21) Appl. No.: 14/391,013

(22) PCT Filed: Apr. 2, 2013

(86) PCT No.: PCT/US2013/035017
§ 371 (c)(1),
(2) Date: Oct. 7, 2014

(87) PCT Pub. No.: WO2013/154874
PCT Pub. Date: Oct. 17, 2013

(65) Prior Publication Data
US 2015/0051304 A1 Feb. 19, 2015

Related U.S. Application Data

(60) Provisional application No. 61/622,293, filed on Apr. 10, 2012.

(51) Int. Cl.
| | |
|---|---|
| *C08G 18/42* | (2006.01) |
| *C08J 9/14* | (2006.01) |
| *C08G 18/48* | (2006.01) |
| *C08G 18/66* | (2006.01) |
| *C08G 18/38* | (2006.01) |
| *C08G 18/40* | (2006.01) |
| *C08G 63/12* | (2006.01) |
| *C08G 18/08* | (2006.01) |
| *C08G 18/72* | (2006.01) |
| *C08G 63/183* | (2006.01) |
| *C08G 63/91* | (2006.01) |
| *C08G 101/00* | (2006.01) |

(52) U.S. Cl.
CPC ......... *C08G 18/4219* (2013.01); *C08G 18/14* (2013.01); *C08G 18/381* (2013.01); *C08G 18/4018* (2013.01); *C08G 18/4208* (2013.01); *C08G 18/4288* (2013.01); *C08G 18/4829* (2013.01); *C08G 18/6633* (2013.01); *C08G 18/72* (2013.01); *C08G 63/12* (2013.01); *C08G 63/183* (2013.01); *C08G 63/916* (2013.01); *C08J 9/143* (2013.01); *C08G 2101/00* (2013.01); *C08G 2101/005* (2013.01); *C08J 2201/022* (2013.01); *C08J 2375/08* (2013.01); *Y02P 20/127* (2015.11)

(58) Field of Classification Search
CPC C08G 18/4219; C08G 18/4288; C08G 63/12; C08G 63/183; C08G 63/916; C08G 18/4208
See application file for complete search history.

(56) References Cited

U.S. PATENT DOCUMENTS

| | | | |
|---|---|---|---|
| 2003/0068490 A1* | 4/2003 | Kaplan | C08G 18/26 428/343 |
| 2007/0225392 A1 | 9/2007 | Shieh | |
| 2012/0202907 A1* | 8/2012 | Kurple | C08L 97/005 521/170 |

FOREIGN PATENT DOCUMENTS

| | | |
|---|---|---|
| WO | 00/58383 | 10/2000 |
| WO | 2004/009670 | 1/2004 |
| WO | 2012/041709 | 4/2012 |
| WO | 2012/072540 | 6/2012 |

OTHER PUBLICATIONS

Canaday, J.S. et.al.; "A Comparison of Aromatic Polyester Polyols for Rigid Urethane and Isocyanurate Foam"; Journal of Cellular Plastics; Sage Publications; vol. 21 No. 5; pp. 338-344; Sep. 1-Oct. 1985.

\* cited by examiner

*Primary Examiner* — Melissa Rioja
(74) *Attorney, Agent, or Firm* — Huntsman International LLC; Robert Diaz

(57) ABSTRACT

Aromatic polyester polyols with high functionality, moderate viscosity, and high aromatic content suitable as the sole polyol in the production of polyurethane foams without the use of any polyether polyols are disclosed. This unique combination of properties makes them suit for use as the sole polyol in the production of polyurethane foams. With reduction of flame retardants, these foams based on sole aromatic polyol can have E-84 class one fire properties. The aromatic polyester polyols of this invention are characterized as having a functionality of greater than 2.8 while having a moderate viscosity ranging from 4,000-10,000 cps @ 25 C. A typical high functional polyester polyol of the present invention has a hydroxyl number in the range of 320-400, viscosity of 4,000-10,000 cps @ 25 C, functionality of greater than 2.8 and percent phenyl content greater than 14.75.

13 Claims, No Drawings

HIGH FUNCTIONAL POLYESTER POLYOLS

This application claims the benefit of priority to U.S. Provisional Application No. 61/622,293, filed 10 Apr. 2012, which is herein incorporated by reference in its entirety.

FIELD OF THE INVENTION

The present invention relates to certain aromatic polyester polyols suitable for use in polyurethane foam manufacture, and methods for preparing such polyols. In particular, the invention relates to aromatic polyester polyols having high functionality (greater than 2.8) and moderate viscosity (less than about 10,000 cps). The present invention further relates to polyurethane foams made from such high functional polyester polyol-based compositions, and to methods for preparing such polyurethane foams.

BACKGROUND OF THE INVENTION

Most aromatic polyester polyols used in the production of polyurethane (PU) foams have low functionally in the range of 2-2.5. As the functionality increases to 2.5 so does the viscosity. Typical viscosity of an aromatic polyester polyol with a functionality approaching 2.5 is above 10,000 cps, too high to be used as a sole source of polyol because of the viscosity limitations of PU foam production equipment. Thus, they are combined with high functionally/low viscosity polyether polyols to yield PU foams of commercial value.

Aromatic polyester polyols have been used in polyurethane and polyisocyanurate foams for some time. U.S. Pat. Nos. 4,604,410 and 4,701,477 disclose a method for making rigid polyurethane and polyisocyanurate foams which entails reacting an excess of an organic polyisocyanate with an etherified modified aromatic polyol. The etherified modified aromatic polyol is prepared by digesting recycled polyalkylene terephthalte (PET) polymers with a low molecular weight polyol, such as diethylene glycol. The resulting product is then blended with a low molecular weight polyol, such as alpha methyl glucoside. The intermediate product is etherified with propylene oxide and/or ethylene oxide.

U.S. Pat. No. 4,469,824 teaches a method for making liquid terephthalic esters that are useful as polyol extenders in rigid polyurethane foams and as the sole polyol component in polyisocyanurate foams. The terephthalic esters are made to remain in a liquid form by reacting recycled polyethylene terephthalte (PET) with diethylene glycol and one or more oxyalkylene glycols. Ethylene glycol is then stripped from the reaction to yield a mixture of ester which is free of solids upon standing. Due to solubility limit, a maximum of 5% alpha-methyl glucoside may be added to increase the functionality of the resulting product.

U.S. Pat. No. 4,644,019 discloses a method for preparing isocyanurate foam that is similar to the methods disclosed above but this method includes reacting an ethoxylate of an alkylphenol, preferably nonylphenol with the polyethylene terephthalate while it is being digested.

U.S. Pat. No. 5,360,900 discloses a method to produce a high functionality and a high aromatic content at a conventional viscosity by combining ethoxylated methyl glucoside or propoxylated methyl glucoside with a polyethylene terephthalte base polyester.

None of the above described polyols are capable of being used as the sole polyol in the production of polyurethane foams because they lack sufficiently high functionality. The present invention provides a series of high functional polyester polyols to meet the challenge.

SUMMARY OF THE INVENTION

The present invention relates to a new and surprisingly useful class of aromatic polyester polyols suitable for use in the manufacture of polyurethane foams. The present invention further relates to polyol-based compositions prepared using such polyols and a blowing agent. The present invention further relates to polyurethane foams made from such polyol-based compositions, and to methods for preparing such polyurethane foams.

The polyols of this invention have moderate viscosity, very high functionality, and high aromatic content. This unique combination of properties makes them suit for use as the sole polyol in the production of polyurethane foams. No polyether polyols are present in the formulation. With minimum amount of flame retardants, the foam based on this sole aromatic polyester polyol can have E-84 class one fire properties rating. The aromatic polyester polyols of this invention are characterized as having a functionality in the range of 2.8 to 3.2 while having a moderate viscosity ranging from 4,000-10,000 cps @ 25 C. A typical high functional polyester polyol of the present invention has a hydroxyl number in the range of 320-400, viscosity of 4,000-10,000 cps @ 25 C, Typically the functionality will range from 2.8 to 3.2 and the percent phenyl content will range from 14.75 to 19.58.

The inventive polyol is prepared by the transesterification or esterification of a mixture comprising:
34-66% w/w glycols,
24-34% w/w terephthalate source,
0-17% w/w glycerin, refined glycerin, crude glycerin,
0-14% w/w pentaerythriol, dipentaerythriol, tripentaerythriol,
0-5% w/w methyl glucoside,
0-10% w/w sorbitol,
0-15% w/w natural vegetable oil, modified natural vegetable oil such as epoxidized soybean oil or tall oil fatty acid.

This invention also provides a composition for preparing PU foam. The typical formulation for a PU foam used in spray applications comprises two components: an A-side, comprising a polyisocyanate and a B-side, comprising a mixture of multiple ingredients including catalyst, surfactant, flame retardant, blowing agent and in major part a polyol component consisting essentially of the high functional, moderate viscosity aromatic polyester polyol of this invention. Typically, the polyol component will be 65-80% (w/w) of the B side component. The polyol component does not include any contribution from polyethers.

A further aspect of the invention provides a method of applying a polyurethane foam comprising the steps of: providing an A-side component comprising polyisocaynate and a B-side component comprising catalysts, surfactant, flame retardants, blowing agents and in major part a polyol component consisting essentially of the inventive high functional, moderate viscosity aromatic polyester polyol, preparing a surface on which to apply the foam; reacting the A-side and B-side components; and applying the reacting components to a surface. The method of forming a PU foam is advantageously applied to a surface of a roof, a structural wall, an insulated cavity, a storage tank or a process vessel.

DETAILED DESCRIPTION OF THE INVENTION

The typical prior art formulation for a PU foam used in spray applications is shown in Table 1. This type of application requires two components: an A-side, a polyisocyanate and a B-side, a mixture of multiple ingredients including an aromatic polyester polyol and polyether polyol.

The polyisocyanate A-side component of the formulations of the present invention preferably include those as are known to those of skill in the art, and it is not intended that the A-side component be limited to those specifically illustrated herein. For example, the polyisocyanate A-side component of the formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred, and polyphenyl polymethylene polyisocyanates (PMDI) is most preferred. Commercially available PMDI products such as are preferred include Mondur® MR Lite from Bayer Corporation, Rubinate® M from Huntsman Corporation, and the like. PMDI in any of its forms is the most preferred polyisocyanate for use with the present invention.

The requirements for a successful B-side are: (1) to be visually clear; (2) to have stable reactivity for a period of time; (3) to have suitable operation viscosity. Subsequently, the polyurethane (PU) foam is generated from reacting one to one equal volume of B-side and A-side via a high pressure spray equipment with heating and proportional metering capabilities. The spray PU foam must: (1) be dimensionally stable (2) have a minimum compressive and tensile strength at nominal two pound density; (3) must be rated E-84 class I fire property for indoor insulation use. The E-84 class I rating is based on burn results of foam with the flame spread less than or equal to 25 and smoke density less than or equal to 450. The biggest challenge to formulators is to have less than or equal to 450 smoke density for their PU foams.

The typical prior art balanced formulation of B-side in the Table 1 meets all the requirements mentioned above. In detail, the aromatic polyester polyol is Terol 256 (manufactured and sold by Oxid LP); polyethers are a combination of JEFFOL R470X and Carpol GSP 280 in the weight percent of 15 and 8 respectively. Flame Retardant 1 is Tris(1-chloro-2-propyl)phosphate (TCPP) and Flame Retardant 2 is PHT4diol, a brominated phthalic anhydrided polyol. The surfactant is a silicon based cell regulator. The co-blowing agents are water and HFC 245FA (1,1,1,3,3-pentafluoropropane) with weight percent of 2.2 and 8 respectively.

TABLE 1

|  |  |  | WT % |
|---|---|---|---|
| Polyol 1 | Polyester | Terol 256 | 44.3 |
| Polyol 2 | Polyether | Jeffol R470X | 15.0 |
| Polyol 3 | Polyether | Carpol GSP 280 | 8.0 |
| Flame Retardant 1 | PHT4 Diol |  | 6 |
| Flame Retardant 2 | TCPP |  | 11 |
| Surfactant |  |  | 1 |
| Total catalyst |  |  | 4.5 |
| Blowing Agent 1 | Water |  | 2.2 |
| Blowing Agent 2 | HFC245fa |  | 8 |
| B side Total |  |  | 100 |

Other blowing agents that can be employed include 365mfc/227 (a mixture of 1,1,1,3,3-pentafluorobutane and 1,1,1,2,3,3,3-heptafluoropropane from Solvay), Solstice™-1233zd(E) (trans-1-chloro-3,3,3-trifluoropropane from Honeywell) and FEA-1100 (Hexafluoro-2-butene from DuPont). The B-side component includes at least one amine catalyst. Commercially available amine catalysts suitable for the present invention include Polycat® 9, Polycat® 12, and Dabco® BL-19 from Air Products; Toyocat DM 70 from Tosoh Speciality Chemicals USA, Inc. Surfactants such as are commercially available as LK-443 and Dabco® DC-193 from Air Products, and the like can also be used in the present invention. Additionally, flame retardants such as Great Lakes PHT-4 Diol, Akzo-Nobel Fyrol®PCF, ICL Industrial Fyrol 6 and the like can be used in the B-side component of the present invention.

Preferably, the Isocyanates:B volume ratio is 1:1. While not desired, a 10% deviation of this ratio is tolerated.

GLOSSARY/DEFINITION

Polyol Functionality—The average number of reactive group per mole of polyol. It is determined by number average molecular weight of polyol (Mn) divided by equivalent weight of polyol (Eqwt). Mn can be measured by gel permeation chromatography (GPC) or vapor pressure osmometry (VPO). Eqwt can be gained by 56,100 divided by hydroxyl number of polyol. There are many ways to determine the hydroxyl number of polyol, The most popular one is wet method titration.

Aromaticity—Terephthalate stands for one phenyl group with 4 hydrogen and 2 carbonyl group attachments, the molecular weight is 132. Phenyl stands for a benzene ring with four hydrogen attachments, molecular weight is 76.

Blowing Agent (BA) Solubility—It is a measurement of how many grams of BA in 100 grams polyol before reaching the saturation point (the solution turns hazy), expressed as parts per hundred parts of polyol (pphpp).

Compressive strength—It is based on ASTM D 1621-73, a measurement of capacity of foam to withstand axially directed pushing force.

Dimensional Stability—It is based on ASTM D2126-87, a measurement of foam's ability to retain the precise shape under different temperature and humidity environment. Ranking is given to the aged foam. A is the best and D or below is unacceptable.

Green Strength—A measurement of the ability of foam to withstand the force before complete cure take place. Foam with over all higher functionality would experience less indentation (penetration) than foam with less functionality in same density and reactivities.

SDR—The average smoke density of foam (three burns) from smoke box.

Jeffol R470X, R425X—A Mannich based polyether polyol made by Huntsman.

Caprol GSP 280—A sucrose/glycerin based polyether polyol made by E.R. Carpenter.

DM 70—Toyocat DM70 is an amine polyurethane catalyst from Tosoh USA

DC 193—A silicon based cell regulator from Air Products

BL 17—An amine polyurethane catalyst from Air Products

PC 9—An amine polyurethane catalyst from Air Products

Crude Glycerin—collected from biodiesel process, normally contains water, glycerin, free fatty acid, fatty acid methyl ester, soap, ash and transesterifaction catalyst such as potassium hydroxide Percent Solids of Polyol—it is determined by Universal Centrifuge (3,000 rpm for 15 minutes) for sampler of 50% solvent and 50% polyol Table 2 summarizes the advantages and disadvantages of each ingredient in the B-side prior art formulation. Terol 256 is aromatic based polyester with hydroxyl number of 265, viscosity of 11,000 cps @ 25 C and functionality of 2.3.

Jeffol-470X is an aromatic amine with hydroxyl number of 470, viscosity of 10,000 cps @ 25 C and functionality of 3.10. GSP 280 is a sucrose/glycerin initiated propylene oxide based polyether polyol with hydroxyl number of 280, viscosity of 3,000 cps @ 25 C and functionality of 7.0. TCPP is Tris(1-chloro-2-propyl)phosphate with viscosity of 65 cps @ 25 C. It contains 9.5% phosphate and 32% chlorine. PHT4diol is a brominated polyester polyol (tetrabromophthalic acid ester) with hydroxyl number of 215 and viscosity of 100,000 cps @ 25 C. It contains 46% bromine. HFC 245 is 1,1,1,3,3-pentafluoropropane.

TABLE 2

| Ingredient | % Phenyl | Functionality | % P | % Cl | % Br | Advantages | Disadvantages |
|---|---|---|---|---|---|---|---|
| Terol 256 | 21.59 | 2.3 | | | | Aromaticity | Lack of functionality |
| Jeffol-470X | 8.1 | 3.1 | | | | Aromaticity & Functionality | Increase little smoke |
| GSP 280 | | 7 | | | | Functionality | Increase smoke |
| TCPP | | 0 | 9.45 | 32 | | Low viscosity and thermal insulation | Increase smoke&acts as a plasticizer |
| PHT4 Diol | 10.36 | 2 | | | 46 | Aromaticity and bromine | High viscosity and material cost |
| B side Total | 11.4 | 2.16 | 1.04 | 3.52 | 2.76 | | |

Terol 256 provides the major aromaticity/phenyl for suppressing smoke density and improving char formation of the PU foam but it lacks the functionality as thus no more polyester polyol can be used because the resulting PU foam will not meet the standard of dimensional stability and compressive strength. Polyether polyols provide the functionality to the foam, but they also increase the smoke density due to its propylene oxide content.

In terms of fire properties of the foam, TCPP stops spreading of the flame over the foam by creating a thermal protective char. The chlorine in TCPP and bromine in PHT4 diol undergo thermal degradation and release chloride and bromide radicals that reduce gas phase flame propagation and smoke evolution. Another advantage of TCPP is that it reduces the viscosity of B-side. However, it also acts as a plasticizer and really hurts the dimensional stability as well as mechanical properties of the foam, To meet the E84 class one rating, the prior art foams need both TCPP and PHT4diol (right ratio) in the formulation.

The cost structure of each ingredient in descending order is PHT4diol, TCPP, polyether polyols and aromatic polyester polyols. The formulators would prefer to use more aromatic polyester polyols, less fire retardants, and no polyether polyols. Thus PU foams will have better fire properties and lower cost, but unless the aromatic polyester polyol has high functionality this could not be achieved until the polyols of this invention were developed.

With the new composition of HF polyester polyol of this invention, a new B-side can be formulated as following Table 3:

TABLE 3

| | | | Wt % |
|---|---|---|---|
| Polyol 1 | Polyester | HF Polyester | 64.3-79.2 |
| Polyol 2 | Polyether | | 0-10 |
| Flame Retardant | | TCPP | 7-10 |
| Surfactant | | | 1 |
| Total Catalysts | | | 4.5-6 |
| Blowing Agent1 | | Water | 2.0-2.3 |
| Blowing Agent2 | | HFC245fa | 7.9-9 |
| Total B Blend | | | 100 |
| B blend appearance | | | Clear |
| B blend viscosity @25 C. | | | 400-1,700 |
| % Phenyl in B | | | 10.74-14.13 |
| % Terephthalate in B | | | 18.65-24.55 |
| % P in B | | | 0.756 |
| % Cl in B | | | 2.56 |

Subsequently, the polyurethane foam made from B side as Table 3 and polyisocyanate can meet the current requirement of PU spray foam.

Oxid has developed a series of high functional polyester polyols to meet the challenge. A typical high functional (HF) polyester polyol has a hydroxyl number ranging between 320-400, viscosity of 4,000-10,000 cps @ 25 C, functionality of greater than 2.8 and percent phenyl content of greater than 14.75 (typically a terephthalate (TERE) content of greater than 25.62. The Table 4 shows a typical transesterification or direct esterification formulation for producing the inventive HF polyester polyol.

TABLE 4

| | Typical | Broad |
|---|---|---|
| Glycols | 50 | 34-66 |
| TERE | 30 | 24-34 |
| Glycerin | 10 | 0-17 |
| Pentaerythriol | 5 | 0-10 |
| Methyl Glucoside | 3 | 0-5 |
| Sorbitol | 4 | 0-10 |
| Natural and Modified Oil/Fatty Acid | 5 | 0-15 |
| Total | 100 | 100 |

In a broad sense, the glycols include ethylene glycol, diethylene glycol, triethylene glycol, tetraethylene glycol, polyethylene glycol, propylene glycol, dipropylene glycol, tripropylene glycol, tetrapropylene glycol and polypropylene glycol.

Glycerin includes source of petroleum based, plant based, animal based, biodiesel recycled crude and refined grade.

Pentaerythriol (PE) includes source from mono, technical, di-pentaerythriol, tripentaerythriol and by-product of manufacturing PE.

Methyl glucoside includes alpha/beta methyl glucoside.

TERE is terephthalate and it comes from polyethylene terephthalate (PET), industrial recycled PET, post-consumer PET, terephthalic acid (TA), industrial recycled TA (Byproduct of Aromatic Carboxylic Acid), phthalic anhydride, isophthalic acid and meta-phthalic acid.

Natural oil/fatty acid includes castor oil, palm oil, cotton oil, soybean oil, corn oil, linseed oil, tung oil, tall oil fatty acid, dimer acid and trimer acid. Modified oil includes epoxidized natural oil.

We also know that trimethyolpropane (TMP) and sorbitol can be used to replace glycerin or PE in this application.

The following examples illustrate the present invention, and are not intended to limit the scope of the invention in any way.

Example 1

Researchers first added 113 grams of diethylene glycol, 1,359 grams of triethylene glycol, 566 grams of tetraethylene glycol, 426 grams of glycerin, 1,917 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, the pot is let to cool down to 250 degree F.

When temperature reaches 250 degree F., researchers add 154 grams of mono PE and 412 grams of castor oil. The pot is heated up to 460 degree F. with vacuum pressure @ 150 mm Hg. The ratio of return to receive is set to three to one. Researchers continue the reactive distillation process until the theoretical amount, 599 grams of ethylene glycol is distilled from the reaction mixture.

The polyol produced according to the above trans-esterification method has the following properties:

| | |
|---|---|
| Hydroxyl number | 313; |
| Acid number | 0.50; |
| Viscosity @ 77 degree F. | 9,400 cps. |

Hydroxyl number is raised up to 333 by adding some diethylene glycol. The final properties are as follows:

| | |
|---|---|
| Hydroxyl number | 333; |
| Acid number | 0.50; |
| Viscosity @ 77 degree F. | 7,800 cps. |
| Polyol Appearance | Clear amber liquid |
| Polyol functionality as calculation | 3.0 |
| % Phenyl in polyol | 17.45 |
| HFC 245fa solubility in pphpp | 30 |
| Solstice ™-1233zd(E) solubility in pphpp | 32.9 |
| FEA-1100 solubility in pphpp | 13.3 |

The polyol is labeled as DS-16059-1.

Example 2

Researchers first add 218 grams of diethylene glycol, 1,376 grams of triethylene glycol, 571 grams of tetraethylene glycol, 223 grams of glycerin, 1,827 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 259 grams of mono PE and 403 grams of castor oil. The pot will be heated up to 460 degree F. with vacuum pressure @ 150 mm Hg. The ratio of return to receive is set to three to one. Researchers continue the reactive distillation process until the theoretical amount, 571 grams of ethylene glycol is distilled from the reaction mixture.

The polyol produced according to the above trans-esterification method has the following properties:

| | |
|---|---|
| Hydroxyl number | 333; |
| Acid number | 0.40; |
| Viscosity @ 77 degree F. | 4,600 cps. |
| Polyol Appearance | Clear amber liquid |
| Polyol functionality as calculation | 2.9 |
| % Phenyl in polyol | 16.79 |
| HFC 245fa solubility in pphpp | 31 |
| Solstice ™-1233zd(E) solubility in pphpp | 34 |
| FEA-1100 solubility in pphpp | 14 |

The polyol is labeled as DS-16060-1.

Example 3

Researchers first add 49 grams of diethylene glycol, 884 grams of triethylene glycol, 1,153 grams of tetraethylene glycol, 358 grams of glycerin, 1,707 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 132 grams of mono PE. The pot will be heated up to 460 degree F. with vacuum pressure @ 150 mm Hg. The ratio of return to receive is set to three to one. Researchers continue the reactive distillation process until the theoretical amount, 534 grams of ethylene glycol is distilled from the reaction mixture.

The polyol produced according to the above trans-esterification method has the following properties:

| | |
|---|---|
| Hydroxyl number | 333; |
| Acid number | 0.40; |
| Viscosity @ 77 degree F. | 5,211 cps. |
| Polyol Appearance | Clear amber liquid |
| Polyol functionality as calculation | 2.8 |
| % Phenyl in polyol | 18.02 |
| HFC 245fa solubility in pphpp | 23 |
| Solstice ™-1233zd(E) solubility in pphpp | 24 |
| FEA-1100 solubility in pphpp | 11 |

The polyol is labeled as DS-16063-1.

Example 4

Researchers first add 225 grams of diethylene glycol, 1,227 grams of triethylene glycol, 500 grams of tetraethylene glycol, 201 grams of glycerin, 1,629 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 256 grams of tech PE that is a mixture of about 90% mono pentaerythritol and 10% di-pentaerythriol and 472 grams of castor oil. The pot will be heated up to 460 degree F. with vacuum pressure @ 150 mm Hg. The ratio of return to receive is set to three to one. Researchers continue the reactive distillation process until the theoretical amount, 509 grams of ethylene glycol is distilled from the reaction mixture.

The polyol produced according to the above trans-esterification method has the following properties:

| | |
|---|---|
| Hydroxyl number | 333; |
| Acid number | 0.40; |
| Viscosity @ 77 degree F. | 4,272 cps. |
| Polyol Appearance | Clear amber liquid |
| Polyol functionality as calculation | 2.8 |
| % Phenyl in polyol | 16.12 |
| HFC 245fa solubility in pphpp | 33 |
| Solstice ™-1233zd(E) solubility in pphpp | 35.8 |
| FEA-1100 solubility in pphpp | 11.8 |

The polyol is labeled as DS-16067-1.

Example 5

Researchers first add 576 grams of diethylene glycol, 760 grams of triethylene glycol, 757 grams of C236 (C236 is a product of 2 moles propylene oxide added to 1 mole of mixtures of ethylene glycol and diethylene glycol in the weight ratio of approximate 80 to 20), and 1,397 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 334 grams of tech PE and 363 grams of castor oil. The pot will be heated up to 460 degree F. with vacuum pressure @ 150 mm Hg. The ratio of return to receive is set to three to one. Researchers continue the reactive distillation process until the theoretical amount, 437 grams of ethylene glycol is distilled from the reaction mixture.

The polyol produced according to the above method has the following properties:

| | |
|---|---|
| Hydroxyl number | 341; |
| Acid number | 0.30; |
| Viscosity @ 77 degree F. | 4,285 cps. |
| Polyol Appearance | Clear amber liquid |
| Polyol functionality as calculation | 2.8 |
| % Phenyl in polyol | 14.75 |
| HFC 245fa solubility in pphpp | 38.4 |
| FEA-1100 solubility in pphpp | 23.5 |
| Water solubility in pphpp | 21.2 |

The polyol is labeled as DS-16017.

Example 6

Researchers first add 740 grams of diethylene glycol, 1,304 grams of tripropylene glycol 353 grams of glycerin, and 1,573 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 175 grams of tech PE and 346 grams of castor oil. The pot will be heated up to 460 degree F. with vacuum pressure @ 150 mm Hg. The ratio of return to receive is set to three to one. Researchers continue the reactive distillation process until the theoretical amount, 437 grams of ethylene glycol is distilled from the reaction mixture.

The polyol produced according to the above method has the following properties:

| | |
|---|---|
| Hydroxyl number | 400; |
| Acid number | 0.50; |
| Viscosity @ 77 degree F. | 5,976 cps. |
| Polyol Appearance | Clear amber liquid |
| Polyol functionality as calculation | 2.9 |
| % Phenyl in polyol | 15.57 |
| HFC 245fa solubility in pphpp | 34 |
| FEA-1100 solubility in pphpp | 29.2 |

The polyol is labeled as DS-16073-400-1.

Example 7

Researchers first add 282 grams of diethylene glycol, 424 grams of triethylene glycol, 1,406 grams of TPG, 387 grams of glycerin, 1,646 grams of polyethylene terephthalate and 4 grams of Tyzor TE (a triethanolamine titanate chelate) into a 4 neck 5 liter glass pot that is equipped with reflux condenser, separation column, overhead polyol receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 119 grams of tech PE. The pot will be heated up to 460 degree F. with vacuum pressure @ 150 mm Hg. The ratio of return to receive is set to three to one. Researchers continue the reactive distillation process until the theoretical amount, 514 grams of ethylene glycol is distilled from the reaction mixture.

The polyol produced according to the above trans-esterification method has the following properties:

| | |
|---|---|
| Hydroxyl number | 363; |
| Acid number | 0.50; |
| Viscosity @ 77 degree F. | 6,190 cps. |
| Appearance | Clear amber liquid |
| Polyol functionality as calculation | 2.8 |
| % Phenyl in polyol | 17.37 |
| HFC 245fa solubility in pphpp | 33 |
| Solstice ™-1233zd(E) solubility in pphpp | 35 |
| FEA-1100 solubility in pphpp | 28 |

The polyol is labeled as DS-16078

Example 8

Researchers charge 6,197 gram of crude glycerin into a 10 liter pot that is equipped with reflux condenser, separation column, overhead receiver and a thermocouple. The crude glycerin contains 23% water as supplier suggests. Heat the pot to 350 degree F. with 10 mmHg vacuum to remove the water and light. Collect condensation @ 188 degree F. pot temperature and overhead temperature on top of column @ 123 degree F. Total overhead collected is 173 grams.

Researchers heat the pot to 430 degree with 10 mm Hg vacuum. The equilibrium reaches @380 degree F. with 10 mm Hg vacuum. Overhead temperature is 181 degree C. total 5,700 grams of refine clear glycerin is collected with hydroxyl number of 1694.6 and percent water of 0.7. This glycerin is called refine glycerin.

Researchers first add 238 grams of diethylene glycol, 966 grams of triethylene glycol, 698 grams of tetraethylene glycol, 383 grams of refine glycerin produced from experiment 8, 1,687 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 162 grams of tech PE and 190 grams of soybean oil. The pot will be heated up to 460 degree F. with vacuum pressure @ 150 mm Hg. The ratio of return to receive is set to three to one. Researchers continue the reactive distillation process until the theoretical amount, 527 grams of ethylene glycol is distilled from the reaction mixture.

The polyol produced according to the above trans-esterification method has the following properties:

| | |
|---|---|
| Hydroxyl number | 350; |
| Acid number | 0.50; |
| Viscosity @ 77 degree F. | 8,494 cps. |
| Appearance | Clear amber liquid |
| Polyol functionality as calculation | 2.8 |
| % Phenyl in polyol | 17.59 |
| HFC 245fa solubility in pphpp | 25 |
| Solstice ™-1233zd(E) solubility in pphpp | 27 |

The polyol is labeled as DS-16105-1

Example 9

Researchers first add 250 grams of diethylene glycol, 721 grams of triethylene glycol, 1,077 grams of tetraethylene glycol, 655 grams of glycerin, 1,748 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 206 grams of soybean oil. The pot will be heated up to 460 degree F. with vacuum pressure @ 150 mm Hg. The ratio of return to receive is set to three to one. Researchers continue the reactive distillation process until the theoretical amount, 547 grams of ethylene glycol is distilled from the reaction mixture.

The polyol produced according to the above method has the following properties:

| | |
|---|---|
| Hydroxyl number | 380; |
| Acid number | 0.50; |
| Viscosity @ 77 degree F. | 5,561 cps. |
| Appearance | Clear amber liquid |
| Polyol functionality as calculation | 2.85 |
| % Phenyl in polyol | 17.31 |
| HFC 245fa solubility in pphpp | 24 |

The polyol is labeled as DS-16115-1

Example 10

Researchers first add 276 grams of diethylene glycol, 935 grams of triethylene glycol, 676 grams of tetraethylene glycol, 370 grams of refine glycerin produced from experiment 8 and 1,633 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 185 grams of methyl glucoside and 185 grams of soybean oil. The pot will be heated up to 460 degree F. with vacuum pressure @ 150 mm Hg. The ratio of return to receive is set to three to one. Researchers continue the reactive distillation process until the theoretical amount, 517 grams of ethylene glycol is distilled from the reaction mixture.

The polyol produced according to the above trans-esterification method has the following properties:

| | |
|---|---|
| Hydroxyl number | 350; |
| Acid number | 0.4; |
| Viscosity @ 77 degree F. | 11,800 cps. |
| Appearance | Clear amber liquid |
| The hydroxyl number of polyol is raised to 375.5 by post addition of diethylene glycol. | |
| Hydroxyl number | 375.50; |
| Acid number | 0.38; |
| Viscosity @ 77 degree F. | 6,950 cps. |
| Polyol functionality as calculation | 2.8 |
| % Phenyl in polyol | 16.62 |
| HFC 245fa solubility in pphpp | 29 |
| Solstice ™1233zd(E) solubility in pphpp | 30 |

The polyol is labeled as DS-16116-3

Example 11

Researchers first add 1,396 grams of triethylene glycol, 701 grams of tetraethylene glycol, 384 grams of glycerin, and 1,695 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F. When temperature reaches 250 degree F., researchers will add 163 grams of tech PE and 191 grams of epoxidized soybean oil. The pot will be heated up to 460 degree F. with vacuum pressure @ 150 mm Hg. The ratio of return to receive is set to three to one. Researchers continue the reactive distillation process until the theoretical amount, 530 grams of ethylene glycol is distilled from the reaction mixture.

The polyol produced according to the above trans-esterification method has the following properties:

| | |
|---|---|
| Hydroxyl number | 350; |
| Acid number | 0.5; |
| Viscosity @ 77 degree F. | 8,677 cps. |
| Appearance | Clear amber liquid |
| Polyol functionality as calculation | 2.95 |
| % Phenyl in polyol | 16.77 |
| HFC 245fa solubility in pphpp | 27 |

The polyol is labeled as DS-16117-1

Example 12

Researchers first add 251 grams of diethylene glycol, 1,018 grams of triethylene glycol, 735 grams of tetraethylene glycol, 403 grams of glycerin, 1,537 grams of terephthalic acid and 4 grams of Tyzor TE (a triethanolamine titanate chelate) into a 4 neck 5 liter glass pot that is equipped with reflux condenser, separation column, overhead receiver and a thermocouple. Researchers then heat the pot to 450 degree F. and hold the pot temperature @ 450 degree F. for 2 hours. Then, researchers will let the pot cool down to 250 degree F. When temperature reaches 250 degree F., researchers will add 171 grams of tech PE and 201 grams of soybean oil. The pot will be heated up to 460 degree F. with vacuum pressure @ 150 mm Hg. The ratio of return to receive is set to three to one. Researchers continue the reactive distillation process until the theoretical amount, 315 grams of water is distilled from the reaction mixture.

The polyol produced according to the above direct esterification method has the following properties:

| | |
|---|---|
| Hydroxyl number | 350; |
| Acid number | 0.5; |
| Viscosity @ 77 degree F. | 9,409 cps. |
| Appearance | Clear amber liquid |
| Polyol functionality as calculation | 2.9 |
| % Phenyl in polyol | 17.59 |
| HFC 245fa solubility in pphpp | 25 |

The polyol is labeled as DS-16118-1

Example 13

Researchers first add 254 grams of diethylene glycol, 1,032 grams of triethylene glycol, 745 grams of tetraethylene glycol, 407 grams of refine glycerin produced from experiment 8, 1,728 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F. When temperature reaches 250 degree F., researchers will add 174 grams of tech PE and 200 grams of soybean oil. The pot will be heated up to 460 degree F. with vacuum pressure @ 150 mm Hg. The ratio of return to receive is set to three to one. Researchers continue the reactive distillation process until the theoretical amount, 540 grams of ethylene glycol is distilled from the reaction mixture.

The polyol produced according to the above trans-esterification method has the following properties:

| | |
|---|---|
| Hydroxyl number | 365; |
| Acid number | 0.50; |
| Viscosity @ 77 degree F. | 7,323 cps. |
| Appearance | Clear amber liquid |
| Polyol functionality as calculation | 2.85 |
| % Phenyl in polyol | 17.1 |
| HFC 245fa solubility in pphpp | 25 |
| Solstice ™1233zd(E) solubility in pphpp | 27 |

The polyol is labeled as DS-16126-1

Example 14

Researchers first add 293 grams of diethylene glycol, 994 grams of triethylene glycol, 689 grams of tetraethylene glycol, 1,716 grams of polyethylene terephthalate and 4 grams of Tyzor TE (a triethanolamine titanate chelate) into a 4 neck 5 liter glass pot that is equipped with reflux condenser, separation column, overhead receiver and a thermocouple.

Researchers then heat the pot to 450 degree F. and hold the pot temperature @ 450 degree F. for 2 hours. Then, researchers will let the pot cool down to 250 degree F.

When temperature reaches 250 degree F., researchers will add 175 grams of tech PE, 222 grams of soybean oil and 558 grams of crude glycerin with 15.5% water as determined by Karl Fisher Titrator. The pot will be heated up to 460 degree F. with vacuum pressure @ 150 mm Hg. The ratio of return to receive is set to three to one. Researchers continue the reactive distillation process until the theoretical amount, 536 grams of ethylene glycol and 86.49 grams of water are distilled from the reaction mixture. The polyol was cooled down to about 160 to 170 degree F. and was filtered through a 25 micron filter bag (Filter Specialists, Inc—BPONG25P2pWE).

The polyol produced according to the above trans-esterification method has the following properties:

| | |
|---|---|
| Hydroxyl number | 388.4; |
| Acid number | 0.40; |
| Viscosity @ 77 degree F. | 4,880 cps. |
| Percent Solid | less than 0.01 |
| Appearance | Clear amber liquid |

The polyol is labeled as DS-16180-C

TABLE 5

Summary of weight percent of functionality enhancements and natural oil or modified one in each polyol example:

| Exam. | PE mono | PE tech | MG | Glycerin pure | Glycerin refine | Glycerin crude | Castor oil | Soybean oil | ESBO |
|---|---|---|---|---|---|---|---|---|---|
| No. 1 | 3.54 | | | 9.80 | | | | 9.48 | |
| No. 2 | 6.01 | | | 5.18 | | | | 9.37 | |
| No. 3 | 3.53 | | | 9.56 | | | | | |
| No. 4 | | 6.4 | | 5.02 | | | | 11.80 | |

TABLE 5-continued

Summary of weight percent of functionality enhancements
and natural oil or modified one in each polyol example:

| Exam. | PE mono | PE tech | MG | Glycerin pure | Glycerin refine | Glycerin crude | Castor oil | Soybean oil | ESBO |
|---|---|---|---|---|---|---|---|---|---|
| No. 5 |  | 8.90 |  |  |  |  | 9.69 |  |  |
| No. 6 |  | 4.38 |  | 8.83 |  |  | 8.66 |  |  |
| No. 7 |  | 3.17 |  | 10.31 |  |  |  |  |  |
| No. 8 |  | 4.28 |  |  | 10.08 |  |  | 5.01 |  |
| No. 9 |  |  |  | 16.37 |  |  |  | 5.14 |  |
| No. 10 |  |  | 4.76 | 9.52 |  |  |  | 4.76 |  |
| No. 11 |  | 4.08 |  | 9.61 |  |  |  |  | 4.76 |
| No. 12 |  | 4.28 |  | 10.08 |  |  |  | 5.01 |  |
| No. 13 |  | 4.34 |  |  | 10.18 |  |  | 5 |  |
| No. 14 |  | 4.37 |  |  |  | 11.16 |  | 5.55 |  |

Note:
(1) Example 3 and 7 do not use any oil;
(2) Example 5 contains PE 90 (technical grade) and castor only;
(3) Example 9 contains glycerin and SBO only;
(4) Example 10 contains MG (replacing PE) glycerin and SBO;
(5) Example 11 uses epoxidized soybean oil (replacing castor and soybean oil);
(6) Example 12 uses crude glycerin directly.

The main functionality enhancements are glycerin and PE. The examples show that the high functional polyol can be made by using PE or glycerin solely (as example 5 and 9). However, with PE and glycerin, polyol seems to be more robust. Castor and epoxidized oil are used for reducing polyol viscosity. They do have some functionality but provide very little of blowing agent solubility improvement. Soybean oil is primarily used for viscosity reduction and for improving blowing agent solubility. Unfortunately, soybean oil does not provide any functionality. Example 3 and 7 contain no oil of any kind. We get the desirable viscosity by employing high loading of high molecular weight glycols.

Oxid has recently acquired a smoke box, an instrument for detecting smoke density of foam. Although the sampler size of foam is only one inch cubic, the results (SDR) of burning from the box can be correlated to smoke density of real E-84 tunnel test. For example, Oxid is able to get foam samplers that have been tested in the E-84 tunnel. The 1$^{st}$ one is a phenolic foam with smoke density of less than 50 (that is determined by E-84); 2$^{nd}$ one is 300 index polyisocyanurate bun stock foam with average smoke density of 190 from two reputable E-84 tunnel tests facilities; 3$^{rd}$ one is current commercial two pound wall cavity spray foam as described at Table 1; the 4$^{th}$ one is a roof foam with smoke density of 600. These foams are carefully cut into many one inch cubic foams. The repeat burn on these foams in smoke box is carried out. The following Table 6 displays the results.

TABLE 6

| Sample | Average Smoke Density of E84 | SDR in Smoke Box |
|---|---|---|
| Phenolic Foam | <50 | 0.34 |
| Bun Foam | 170-200 | 24.25 |
| Commercial spray foam | 350-450 | 35.25 |
| Experiment Roof foam | 650 | 53.25 |

If charted, the data of Table 6 clearly shows that SD 200 to 650 of E84 vs. SDR of smoke box is almost linear correlation.

Table 7 shows the composition of experiment polyol as Example 2:

TABLE 7

| Example 2 composition | Wt % |
|---|---|
| DEG | 5.07 |
| TEG | 31.95 |
| TTEG | 13.25 |
| TERE | 29.17 |
| Glycerin | 5.18 |
| PE mono | 6.01 |
| Castor Oil | 9.37 |
| Hydroxyl No. | 333 |
| Viscosity @ 25 C. in cps | 4,650 |
| Acid No. | 0.5 |
| Calculated Functionality | 2.9 |

Five polyurethane foams and control are prepared in the lab based on the formula of the following Table 8:

TABLE 8

Formula for HFC245fa/water wall cavity spray

| | Name | EQ WT | Control | PBW1 | PBW2 | PBW3 | PBW4 | PBW5 |
|---|---|---|---|---|---|---|---|---|
| Polyester1 | Terol256 | 211.7 | 46.2 |  |  |  |  |  |
| Polyester2 | Example 2 | 168.5 |  | 86.2 | 78.2 | 78.2 | 73.2 | 68.2 |
| Polyether1 | GSP 280 | 200.4 | 8 |  |  |  | 5 | 10 |
| Polyether2 | Jeffol | 119.4 | 15 |  |  |  |  |  |

TABLE 8-continued

Formula for HFC245fa/water wall cavity spray

|  | Name | EQ WT | Control | PBW1 | PBW2 | PBW3 | PBW4 | PBW5 |
|---|---|---|---|---|---|---|---|---|
|  | 470X* |  |  |  |  |  |  |  |
| Fire Retardant 1 | PHT4diol | 260.9 | 6 |  | 4 |  |  |  |
| Fire Retardant 2 | TCPP |  | 11 |  | 4 | 8 | 8 | 8 |
| Surfactant | DC193 |  | 1 | 1 | 1 | 1 | 1 | 1 |
| Catalyst 1 | DM70 |  | 0.8 | 0.8 | 0.8 | 0.8 | 0.8 | 0.8 |
| Catalyst 2 | ZR70 | 133 | 1.8 | 1.8 | 1.8 | 1.8 | 1.8 | 1.8 |
| Water |  |  | 2.2 | 2.2 | 2.2 | 2.2 | 2.2 | 2.2 |
| HFC245fa |  |  | 8 | 8 | 8 | 8 | 8 | 8 |
| B total |  |  | 100 | 100 | 100 | 100 | 100 | 100 |
| Index |  |  | 1.19 | 1.03 | 1.07 | 1.09 | 1.1 | 1.11 |
| Iso. total |  |  | 105 | 105 | 105 | 105 | 105 | 105 |
| Reaction Temp, ° C. |  |  | 15.4 | 15.4 | 15.4 | 15.4 | 15.4 | 15.4 |
| Gel time |  |  | 24 | 23 | 23 | 23 | 23 | 23 |
| B appearance |  |  | Clear | Clear | Clear | Clear | Clear | Clear |
| B viscosity @ 25 C. in cps |  |  | 1,001 | 1,160 | 1,048 | 823 | 785 | 770 |
| Free Rise Density, pcf |  |  | 2.25 | 2.32 | 2.33 | 2.31 | 2.36 | 2.47 |
| Dim Stab 24 hrs @ 70° C. & 100% Humidity |  |  | B+ | B+ | B+ | B | B+ | B− |
| SDR in SM Box |  |  | 36.25 | 20.46 | 27.68 | 33.87 | 40.69 | 38.21 |
| % P in B |  |  | 1.04 | 0 | 0.378 | 0.756 | 0.756 | 0.756 |
| % Cl in B |  |  | 3.52 | 0 | 1.28 | 2.56 | 2.56 | 2.56 |
| % Br in B |  |  | 2.76 | 0 | 1.84 | 0 | 0 | 0 |
| % Phenyl in B |  |  | 11.72 | 14.48 | 13.54 | 13.13 | 12.29 | 11.45 |

*Jeffol 470X has 8.1% phenyl in polyol

As mentioned above, the control foam meets all the requirements of commercial application. The SDR value of control foam is 36.25. Based on correlation of Table 6, that is about 400-450 of E-84 tunnel test. (Note: SDR value from Smoke Box is a laboratory test of one cubic inch foam smoke density property. The correlation is just for foam smoke property screening purpose of E84 test. We are not predicting the real E-84 burning smoke density number of actual big scale spray foam due to many other factors are involved.) PBW1 foam with 100% polyester polyol and 0% flame retardants is 20.46 that is almost equivalent to smoke density of 190 of E84. Four percent of PHT4diol and TCPP respectively added to B blend, the SDR value of PBW2 foam increases to 27.68 as expected. When four percent of PHT4diol is replaced by TCPP, the SDR value of PBW3 foam increases to 33.87. TCPP generates more smoke than PHT4diol does. When 5 percent of Carpol GSP 280 is added into B blend, the SDR value of PBW4 further increases to 40.69. When ten percent of Carpol GSP 280 is added to the blend, the SDR of PBW5 foam decreases a little bit (perhaps due to more cross linking density). Nonetheless, the polyether does generate smoke. Based on the above results, it seems to me that phenyl (aromaticity) content of B blend is the most important parameter for the smoke density of foam.

In other words, 100 percent polyester as solo polyol in the B blend without any polyether and flame retardant is the best method to suppress the smoke density of polyurethane foam. Unfortunately, polyurethane foam is organic material that does need some flame retardants, especially phosphorus to prevent the flame from spreading while burning. Therefore, concerning about foam flame spread and optimal processing viscosity, we recommend seven or ten percent TCPP should be included in the formulation as PBW3 of Table 8. Clearly, PBW3 contains no PHT4diol and its foam has less smoke density (SDR=33.87) than the control foam does (SDR=36.25).

The following is another example.

Table 9 Shows the Composition of Experiment Polyol as Example 1:

TABLE 9

| Example 1 composition | Wt % |
|---|---|
| DEG | 2.59 |
| TEG | 31.26 |
| TTEG | 13.02 |
| TERE | 30.30 |
| Glycerin | 9.8 |
| PE mono | 3.54 |
| Castor Oil | 9.48 |
| Hydroxyl No. | 333 |
| Viscosity @ 25 C. in cps | 7,800 |
| Acid No. | 0.5 |
| Functionality | 3.0 |

TABLE 10

Formula for HFC245fa/water wall cavity spray based on example 1 polyol

|  | Name | EQ WT | PBW1 | PBW2 | PBW3 | PBW4 | PBW5 |
|---|---|---|---|---|---|---|---|
| Polyester | Example 1 | 168.5 | 85.8 | 78.2 | 78.2 | 73.2 | 68.2 |
| Fire Retardant 1 | PHT4diol | 260.9 |  | 2.1 | 5 | 6.4 | 8.5 |
| Fire Retardant 2 | TCPP |  |  | 2.1 | 5 | 6.4 | 8.5 |
| Surfactant | DC193 |  | 1 | 1 | 1 | 1 | 1 |
| Catalyst 1 | DM70 |  | 0.8 | 0.8 | 0.8 | 0.8 | 0.8 |
| Catalyst 2 | ZR70 |  | 2 | 2 | 2 | 2 | 2 |
| Catalyst 3 | BL 17 |  | 0.2 | 0.2 | 0.2 | 0.2 | 0.2 |
| Water |  |  | 2.2 | 2.2 | 2.2 | 2.2 | 2.2 |
| HFC245fa |  |  | 8 | 8 | 8 | 8 | 8 |
|  |  |  |  |  |  |  |  |
| B total |  |  | 100 | 100 | 100 | 100 | 100 |
| Index |  |  | 1.03 | 1.06 | 1.11 | 1.14 | 1.18 |
| Iso. total |  |  | 105 | 105 | 105 | 105 | 105 |
| Rx Temp, ° C. |  |  | 15.4 | 15.4 | 15.4 | 15.4 | 15.4 |
| Gel time |  |  | 23 | 23 | 23 | 23 | 23 |
| B appearance |  |  | Clear | Clear | Clear | Clear | Clear |
| Free Rise Density, pcf |  |  | 2.26 | 2.18 | 2.21 | 2.15 | 2.31 |
| Dim Stab 24 hrs @ 70° C. & 100% Humidity |  |  | B+ | B+ | B | B+ | B− |
| SDR in SM Box |  |  | 24.81 | 30.78 | 33.75 | 44.34 | 42.12 |
| % P in B |  |  | 0 | 0.198 | 0.47 | 0.6 | 0.8 |
| % Cl in B |  |  | 0 | 0.672 | 1.6 | 2.048 | 2.72 |
| % Br in B |  |  | 0 | 0.009 | 0.02 | 0.027 | 0.036 |
| % Phenyl in B |  |  | 14.97 | 13.86 | 14.16 | 13.44 | 12.78 |

Again, the 100% polyester polyol as PBW1 of Table 10 generates the lowest smoke among five formulations. The more TCPP and PHT4diol in the formulation, the SDR of foam increases.

TABLE 11

Formula for Solstice™-1233zd(E)/water wall cavity spray

|  | Name | EQ WT | PBW1 | PBW2 |
|---|---|---|---|---|
| Polyester | Example 1 | 168.5 | 76.1 |  |
| Polyester | Example 2 | 168.5 |  | 86.4 |
| Fire Retardant | TCPP |  | 8 |  |
| Surfactant | DC193 |  | 1 | 1 |
| Catalyst 1 | DM70 |  | 0.8 | 0.8 |
| Catalyst 2 | ZR70 | 133 | 1.8 | 1.8 |
| Water |  |  | 1.7 | 2 |
| Solstice™-1233zd(E) |  |  | 10.6 | 8 |
|  |  |  |  |  |
| B total |  |  | 100 | 100 |
| Index |  |  | 1.2 | 1.05 |
| Iso. A total |  |  | 105 | 105 |
| Reaction Temp, ° C. |  |  | 15.4 | 15.4 |
| Gel time |  |  | 24 | 21 |
| B appearance |  |  | Clear | Clear |
| Free Rise Density, pcf |  |  | 2.33 | 2.54 |
| B viscosity @ 25 C. in cps |  |  | 379 | 1,320 |
| Dim Stab 24 hrs @ 70° C. & 100% Humidity |  |  | B+ | B− |
| SDR in SM Box |  |  | 36.56 | 23.81 |

Replacing HFC 245FA by Solstice™-1233zd(E), the SDR of polyurethane foams based on these two polyols seems to be close. In the case of polyol of example 1, with 8 percent TCPP, PBW3 on Table 10 is 33.75 and PBW1 on Table 11 is 36.56. In the case of polyol of example 2, with 0 percent flame retardants, PBW2 on Table 9 is 20.46 and PBW2 on Table 11 is 23.81. Example 3 contains PE and glycerin but no castor oil. Its foam smoke property is in line of example 1 and example 2 polyol.

TABLE 12

| Example 3 composition | Wt % |
|---|---|
| DEG | 1.29 |
| TEG | 23.57 |
| TTEG | 30.74 |
| TERE | 28 |
| Glycerin | 9.56 |
| PE mono | 3.53 |
| Hydroxyl No. | 333 |
| Viscosity @ 25 C. in cps | 5,211 |

TABLE 13

|  | Name | EQ WT | PBW1 | PBW2 | PBW3 |
|---|---|---|---|---|---|
| Polyester | Example 3 | 168.5 | 86.2 | 82.2 | 78.2 |
| Fire Retardant | TCPP |  |  | 4 | 8 |
| Surfactant | DC193 |  | 1 | 1 | 1 |
| Catalyst 1 | DM70 |  | 0.8 | 0.8 | 0.8 |
| Catalyst 2 | ZR70 | 133 | 2 | 2 | 2 |
| Water |  |  | 2 | 2 | 2 |
| Solstice™-1233zd(E) |  |  | 8 | 8 | 8 |
|  |  |  |  |  |  |
| B total |  |  | 100 | 100 | 100 |
| Index |  |  | 1.05 | 1.09 | 1.13 |
| Iso. total |  |  | 105 | 105 | 105 |
| Reaction Temp, ° C. |  |  | 15.4 | 15.4 | 15.4 |
| Gel time |  |  | 20 | 20 | 21 |
| B appearance |  |  | Clear | Clear | Clear |
| Free Rise Density, pcf |  |  | 2.25 | 2.3 | 2.29 |
| B viscosity @ 25 C. in cps |  |  |  | 1,349 | 993 |
| Dim Stab 24 hrs @ 70° C. & 100% Humidity |  |  | B+ | B− | B− |
| SDR of SM Box |  |  | 21.18 | 32.37 | 35.52 |

With 8 percent TCPP, the PBW3 on Table 13 has viscosity of 993 cps @ 25° C. and 35.52 SDR value.

The example 4 polyol has the composition as in the Table 14.

TABLE 14

| Example 4 composition | Wt % |
|---|---|
| DEG | 5.62 |
| TEG | 30.67 |
| TTEG | 12.49 |
| TERE | 28 |
| Glycerin | 5.02 |
| PE mono | 6.4 |
| Castor Oil | 11.8 |
| Hydroxyl No. | 333 |
| Viscosity @ 25 C. in cps | 4,272 |
| Acid No. | 0.5 |
| Functionality | 2.8 |

TABLE 15

Formula for HFC245fa/water wall cavity spray based on example 4 polyol

|  | Name | EQ WT | PBW1 | PBW2 | PBW3 | PBW4 | PBW5 |
|---|---|---|---|---|---|---|---|
| Polyester | Example 4 | 168.5 | 86.4 | 80.4 | 78.2 | 73.2 | 68.2 |
| Polyether | Jeffol 425* | 132 |  |  |  | 5 | 10 |
| Fire Retardant 1 | PHT4diol | 260.9 |  | 3 |  |  |  |
| Fire Retardant 2 | TCPP |  |  | 3 | 6 | 6 | 6 |
| Surfactant | DC193 |  | 1 | 1 | 1 | 1 | 1 |
| Catalyst 1 | DM70 |  | 0.8 | 0.8 | 0.8 | 0.8 | 0.8 |
| Catalyst 2 | ZR70 | 133 | 1.8 | 1.8 | 1.8 | 1.8 | 1.8 |
| Water |  |  | 2.0 | 2.2 | 2.2 | 2.2 | 2.2 |
| HFC245fa |  |  | 8 | 8 | 8 | 8 | 8 |
| B total |  |  | 100 | 100 | 100 | 100 | 100 |
| Index |  |  | 1.05 | 1.09 | 1.11 | 1.09 | 1.08 |
| Iso. total |  |  | 105 | 105 | 105 | 105 | 105 |
| Reaction Temp, ° C. |  |  | 15.4 | 15.4 | 15.4 | 15.4 | 15.4 |
| Gel time |  |  | 22 | 22 | 22 | 22 | 22 |
| B appearance |  |  | Clear | Clear | Clear | Clear | Clear |
| B viscosity @ 25 C. in cps |  |  | 1,126 | 969 | 854 | 890 | 854 |
| Free Rise Density, pcf |  |  | 2.19 | 2.21 | 2.28 | 2.19 | 2.18 |
| Dim Stab 24 hrs @ 70° C. & 100% Humidity |  |  | B+ | B+ | B | B+ | B− |
| SDR in SM Box |  |  | 27.84 | 30.75 | 29.93 | 38.43 | 37.53 |
| % P in B |  |  | 0 | 0.28 | 0.56 | 0.56 | 0.56 |
| % Cl in B |  |  | 0 | 0.96 | 1.92 | 1.92 | 1.92 |
| % Br in B |  |  | 0 | 1.38 | 0 | 0 | 0 |
| % Phenyl in B |  |  | 13.93 | 13.27 | 12.61 | 12.19 | 11.77 |

*Jeffol 425, a Mannich based polyether polyol from Huntsman has 7.73% phenyl in polyol.

Again, we see the dominant effect of phenyl (aromaticity) in B blend on smoke density of foam. Obviously, more castor oil does increase more smoke. Compared to GSP 280, the Jeffol 425X created less smoke.

In Example 5, 6 and 7, we are adding C236 as well as Tripropylene glycol to increase the polyol solubility of FEA 1100. The polyol as example 6 has 29 pphpp FEA1100 solubility and the polyol as example 7 has 28 pphpp FEA1100 solubility. Pphpp stands for parts per hundred parts of polyol.

The foam example of polyol example 7 displays on Table 16.

TABLE 16

|  | Example 5 Wt % | Example 6 Wt % | Example 7 Wt % |
|---|---|---|---|
| DEG | 15.35 | 18.5 | 7.52 |
| TEG | 20.27 |  | 11.32 |
| C236 | 20.18 |  |  |
| TPG |  | 32.6 | 37.51 |
| Glycerin |  | 8.83 | 10.31 |
| TERE | 25.61 | 27.04 | 30.17 |
| PE tech | 8.9 | 4.38 | 3.17 |
| Castor Oil | 9.69 | 8.66 |  |
| Hydroxyl No. | 341 | 400 | 363 |
| Viscosity @25° C. in cps | 4,285 | 5,967 | 6,190 |

TABLE 17

Formula for water/HFC245fa and water/FEA1100 wall cavity spray based on example 7 polyol

|  | Name | EQ WT | PBW1 |
|---|---|---|---|
| Polyester | Example 7 | 154.6 | 74.67 |
| Fire Retardant | TCPP |  | 8 |
| Surfactant | DC193 |  | 1 |
| Catalyst 1 | DM70 |  | 0.76 |
| Catalyst 2 | PC9 |  | 0.6 |

TABLE 17-continued

Formula for water/HFC245fa and water/FEA1100 wall cavity spray based on example 7 polyol

| | Name | EQ WT | PBW1 |
|---|---|---|---|
| Catalyst 3 | BL 17 | | 0.5 |
| Water | | | 1.71 |
| FEA-1100 | | | 12.73 |
| B total | | | 100 |
| Index | | | 1.17 |
| Iso. total | | | 105 |
| Reaction Temp, ° C. | | | 15.4 |
| Gel time | | | 30 |
| B appearance | | | Clear |
| Free Rise Density, pcf | | | 2.24 |
| B viscosity @ 25 C. in cps | | | 724 |
| Dim Stab 24 hrs @ 70° C. & 100% Humidity | | | A |
| SDR in SM Box | | | 37.5 |

PBW1 on Table 17 has an excellent dimensional stability. Smoke density based on SDR value is high but manageable. TPG in the polyol provides plenty of FEA1100 solubility to the B Blend.

TABLE 18

| | Example 8 Wt % | Example 9 Wt % | Example 10 Wt % |
|---|---|---|---|
| DEG | 6.27 | 3.48 | 7.35 |
| TEG | 25.44 | 26.1 | 24.94 |
| TTEG | 18.37 | 18.85 | 18.01 |
| Glycerin Refined from example | 10.08 | | 9.88 |
| Glycerin | | 16.37 | |
| TERE | 30.54 | 30.06 | 29.94 |
| PE tech | 4.28 | | |
| Methyl Glucoside | | | 4.93 |
| Soybean Oil | 5.01 | 5.4 | 4.94 |
| Hydroxyl No. | 350 | 380 | 375 |
| Viscosity @25° C. in cps | 8,494 | 5,561 | 6,950 |

TABLE 19

Formula for water/HFC245fa wall cavity spray based on example 8 polyol

| | Name | EQ WT | PBW1 |
|---|---|---|---|
| Polyester | Example 8 | 160.3 | 79.25 |
| Fire retardant | TCPP | | 8 |
| Surfactant | DC193 | | 1 |
| Catalyst 1 | DM70 | | 0.75 |
| Catalyst 2 | PC 9 | | 0.3 |
| Catalyst 3 | BL 17 | | 0.5 |
| Water | | | 2.2 |
| HFC245fa | | | 8 |
| B total | | | 100 |
| Index | | | 1.07 |
| Iso. total | | | 105 |
| Reacting Temp, ° C. | | | 15.4 |
| Gel time | | | 27 |
| B appearance | | | Clear |
| Free Rise Density, pcf | | | 2.29 |
| B viscosity @ 25 C. in cps | | | 1,643 |
| Dim Stab 24 hrs @ 70° C. & 100% Humidity | | | B |
| SDR in SM Box | | | 34 |

Although Example 8 and 10 polyol contains refined glycerin; it performs the same as if it contains the pure glycerin. It is believed that nature oil would increase smoke density of foam. However, the SDR value of PBW1 on Table 19 shows that five percent of soybean oil in the polyol seems to be fine. Again, clearly, containing no PHT4diol, PBW1 foam has lower SDR than the control foam does,

TABLE 20

Formula for water/HFC245fa wall cavity spray based on example 9

| | Name | EQ WT | PBW1 |
|---|---|---|---|
| Polyester | Example 9 | 147.63 | 79.4 |
| Fire Retardant | TCPP | | 8 |
| Surfactant | DC193 | | 1 |
| Catalyst 1 | DM70 | | 0.5 |
| Catalyst 2 | PC 9 | | 0.6 |
| Catalyst 3 | BL 17 | | 0.25 |
| Water | | | 2.2 |
| Solstice ™-1233zd(E) | | | 8 |
| B total | | | 100 |
| Index | | | 1.01 |
| Iso. total | | | 105 |
| Reaction Temp, ° C. | | | 15.4 |
| Gel time | | | 30 |
| B appearance | | | Clear |
| Free Rise Density, pcf | | | 2.23 |
| B viscosity @ 25 C. in cps | | | 1,149 |
| Dim Stab 24 hrs @ 70° C. & 100% Humidity | | | B− |
| SDR in SM Box | | | 37 |

The example polyol 9 contains 16.34 percent glycerin and no PE. The dimensional stability of PBW1 on Table 20 is not as good as others but acceptable. The smoke will be on the borderline. Example polyol 10 containing about 5% MG seems to be fine with hydroxyl value of 375 and viscosity of 6,950 cps @ 77 F.

The example 12 polyol produced by direct esterification method has same results of example 8 that is produced by trans-esterification method does in terms of hydroxyl number, acid number, viscosity and HFC245FA solubility.

Comparative Example 1

Terol 925 (supplied by Oxid LP) is a high aromatic content, high functionality polyester polyol. Terol 925 has been found useful in spray formulations requiring an E-84 Class I rating using 245fa. The typical properties of Terol 925 are as follows:

| Hydroxyl Number | 305; |
|---|---|
| Viscosity @ 25 C. | 11,500 cps; |
| Acid Number | 1.0; |
| Phenyl content | about 21.9, |
| Nominal Functionality | 2.45. |

Table 21 shows the PUR foam formulation and physical properties of foams based on Terol 925 (comparative example 1) and Example polyol 13.

TABLE 21

| ID | Name | EQ WT | PBW1 | PBW2 |
|---|---|---|---|---|
| Polyester 1 | Terol 925 | 187 | 79.4 | |
| Polyester 2 | Example 13 | 153.7 | | 79.4 |
| Fire Retardant | TCPP | | 8 | 8 |
| Surfactant | DC193 | | 1 | 1 |
| Catalyst 1 | DM70 | | 0.5 | 0.5 |
| Catalyst 2 | PC 9 | | 0.6 | 0.6 |
| Catalyst 3 | BL 17 | | 0.25 | 0.25 |

TABLE 21-continued

| ID | Name | EQ WT | PBW1 | PBW2 |
|---|---|---|---|---|
| Water | | | 2.2 | 2.2 |
| Solstice ™-1233zd(E) | | | 8 | 8 |
| B total | | | 100 | 100 |
| Index | | | 1.18 | 1.04 |
| Iso. total | | | 105 | 105 |
| Reaction Temp, ° C. | | | 15.4 | 15.4 |
| Gel time | | | 31 | 29 |
| B appearance | | | Clear | Clear |
| Free Rise Density, pcf | | | 2.25 | 2.24 |
| B viscosity @ 25 C. in cps | | | 1,744 | 1,327 |
| Compressive strength, in psi parallel to rise direction | | | 22.9 | 24.2 |
| Green Strength, indentation in mm, | | | 8.68 | 2.72 |
| Dim Stab 24 hrs @ 70° C. & 100% Humidity | | | D- | B |
| SDR in SM Box | | | 32.75 | 33.96 | as shown, the polyol ester loading of PBW1 and PBW2 of Table 21 are the same. The B side viscosity of PBW1 is 1,744 cps that is much higher than typical handling desirable viscosity. The comparative polyol has higher reaction index than example 13 does. However, the foam properties in terms of compressive strength, green strength and dimensional stability, the example 9 is much superior to comparative polyol—Terol 925. Without polyether polyol, T925 would have difficulties to provide the much needed physical properties to the foam. The example 13 and other HF polyols as sole polyol in the B blend would provide the physical properties to the spray polyurethane foam. Due to higher aromaticity, the Terol 925 has less smoke density than polyol as example 13 does.

Comparative Example 2

TABLE 22

| ID | Name | EQ WT | PBW1 |
|---|---|---|---|
| Polyether 1 | Jeffol R470X | 119.4 | 44.95 |
| Polyether 2 | GSP 280 | 200.4 | 33.71 |
| Fire Retardant | TCPP | | 8 |
| Surfactant | DC193 | | 1 |
| Catalyst 1 | DM70 | | 0.8 |
| Catalyst 2 | PC 9 | | 0.6 |
| Catalyst 3 | BL 17 | | 0.7 |
| Water | | | 2.2 |
| Solstice ™-1233zd(E) | | | 8 |
| B total | | | 100 |
| Index | | | 1.00 |
| Iso. total | | | 105 |
| Reaction Temp, ° C. | | | 15.4 |
| Gel time | | | 29 |
| B appearance | | | Clear |
| Free Rise Density, pcf | | | 2.13 |
| B viscosity @ 25 C. in cps | | | 1,062 |
| Compressive strength, in psi parallel to rise direction | | | 22.9 |
| Green Strength, indentation in mm, | | | 0.68 |

TABLE 22-continued

| ID | Name | EQ WT | PBW1 |
|---|---|---|---|
| Dim Stab 24 hrs @ 70° C. & 100% Humidity | | | A |
| SDR in SM Box | | | 66 | a 100% polyether (Jeffol 470X and GSP 280) foam is prepared based on the formulation PBW1 on Table 22. As expected, the foam has excellent physical properties including ranking A dimensional stability, minimal indentation of green strength. However, the smoke density is quite high that is almost twice of the foams based on our new polyester.

Based on the polyol formulation excluding example 5, 6 and 7 as mentioned above, 3,000 pounds of polyol was produced in pilot plant, labeled as XO 12009. The typical polyol properties are on the Table 23.

TABLE 23

| XO 12009 Aromatic Polyester Polyol | |
|---|---|
| Attribute | Property |
| Hydroxyl Number (mg KOH/g) | 383 |
| Viscosity @ 25° C. (cPs) | 6,136 |
| Acid Number | 0.7 |
| Water (%) | 0.1 |
| Solubility of HFC-365mfc/227 (pphpp) | 17 |
| Solubility of HFC-245fa (pphpp) | 26 |
| Solubility of Solstice ™ 1233 zd(E) (pphpp) | 28 |

We sprayed several commercial wall and roof polyurethane foam in Canada using XO 12009 aromatic polyester polyol. The E-84 tunnel tests were conducted at Exova in Toronto, Canada.

The Formulation Used to Prepare the Foam Samples Evaluated as Shown Below:

TABLE 24

| B Side formulation Component | Product | Wall Weight % | Roof 1 Weight % | Roof 2 Weight % |
|---|---|---|---|---|
| Polyester Polyol | XO12009 | 70.45 | 76.12 | 76.73 |
| Flame Retardant 1 | TCPP | 9 | 9 | 4 |
| Flame Retardant 2 | PHT4DIOL | | | 4 |
| Surfactant | Silstab 2100 | 1 | 1 | 1 |
| Catalyst 1 | Jeffcat ZF 20 | 0.8 | 0.7 | 0.7 |
| Catalyst 2 | Toyocat DM 70 | 2.5 | 2.5 | 2.5 |
| Catalyst 3 | Jeffcat Z 80 | 0.6 | 0.6 | 0.6 |
| Blowing Agent 1 | HFC 245fa | | 0.62 | 0.57 |
| Blowing Agent 2 | HFC 365mfc/227 | 14.0 | 7.6 | 8.1 |
| Blowing Agent 3 | Water | 1.65 | 1.86 | 1.8 |
| Total | | 100 | 100 | 100 |
| B side blend appearance | | Clear | Clear | Clear |
| B side blend viscosity @ 25 C. (cPs) | | 621 | | |

The Processing Conditions are Found Below on Table 25

TABLE 25

| Processing Conditions | Wall | Roof 1 | Roof 2 |
|---|---|---|---|
| Spray Unit | Gusmer E30 | Gusmer E30 | Gusmer E30 |

TABLE 25-continued

| Processing Conditions | Wall | Roof 1 | Roof 2 |
|---|---|---|---|
| Spray Gun | Air Purge Fusion | Air Purge Fusion | Air Purge Fusion |
| Line Pressure (psi) | 1,450 | 1,450 | 1,450 |
| Line Temperature (F) | 125 | 125 | 125 |
| Volume Ratio (Iso:B) | 1:1 | 1:1 | 1:1 |
| Foam Rise Time (second) | 3.8 | 3.8 | 3.8 |
| Foam Spraying | One Pass 4 inches | Two Passes one inch | Two Passes one inch |

The Physical Properties of Foams Based on XO 12009 are on Table 26:

TABLE 26

| Foam Physical Properties | Wall | Roof 1 | Roof 2 |
|---|---|---|---|
| In Place Density (pcf) | 2.1 | 2.73 | 2.73 |
| Compressive Strength (psi), parallel to rise | 25.29 | | |
| Initial K-factor (BTU in/Hr ft$^2$ F.) | 0.149 | | |
| Initial R value @ 1" | 6.71 | | |
| Dimensional Stability(% volume change after 14 day aging) @ 158 F./ 95% R.H. | 6.22 | | |
| Fire Test Performance $^a$ (ASTM E-84) | | | |
| Flame Spread | 20 | 20 | 20 |
| Smoke Density Developed | 450 | 400 | 350 |

The fire properties of foams based on XO 12009 polyol are excellent as predicted. These HFC365mfc/227 and water blown (with/without a touch of HFC 245fa) foams are able to gain E-84 class one rating easily.

What is claimed is:

1. An aromatic polyester polyol, suitable as the sole polyol in the production of polyurethane foams that have an E-84 tunnel fire test class one rating, said aromatic polyester polyol having a functionality range from 2.8 to 3.2 and a moderate viscosity ranging from 4,000-10,000 cps @ 25° C. inclusive, wherein said polyol is prepared by the transesterification or esterification of a mixture comprising:
    46.9-66% w/w of a glycol,
    24-34% w/w of a terephthalate source,
    5.02-17% w/w glycerin,
    0-14% w/w pentaerythritol,
    0-5% w/w methyl glucoside,
    0-10% w/w sorbitol,
    0-15% w/w of a natural vegetable oil, modified natural vegetable oil or fatty acid derivative of vegetable oil.

2. The aromatic polyester polyol of claim 1 wherein the glycol is ethylene glycol, polyethylene glycol, propylene glycol, or polypropylene glycol.

3. The aromatic polyester polyol of claim 1 wherein the terephthalate source is polyethylene terephthalate (PET), industrial recycled PET, post-consumer PET, terephthalic acid (TA), industrial recycled TA (BACA), phthalic anhydride, iso-phthalic acid or meta-phthalic acid.

4. The aromatic polyester polyol of claim 1 wherein the mixture comprises the natural vegetable oil or the fatty acid derivative of vegetable oil wherein the natural vegetable oil is castor oil, palm oil, cotton oil, soybean oil, epoxidized soybean oil, corn oil, tall oil, linseed oil, epoxidized linseed oil, tung oil, or tofu oil, or the fatty acid derivative of vegetable oil is a fatty acid derivative of castor oil, palm oil, cotton oil, soybean oil, corn oil, tall oil, linseed oil, tung oil, or tofu oil.

5. The aromatic polyester polyol of claim 1 further characterized as having a hydroxyl number in the range of 320-400 inclusive and percent phenyl content w/w in the range of 14.75 to 19.58.

6. A composition for preparing polyurethane foam comprising: an A-side component comprising polyisocyanate; and a B-side component comprising catalyst, surfactant, flame retardant, blowing agent and in major part a polyol component consisting essentially of the aromatic polyester polyol according to claim 1 and essentially free of polyether polyol.

7. The composition of claim 6 wherein the polyol component is 65-80% w/w of the B-side component.

8. The composition of claim 6 wherein the volume ratio of A-side component to B-side component is 1:1.

9. The composition of claim 6 wherein the blowing agent is water, pentafluoropropane, pentafluorobutane, heptafluoropropane, chloro-trifluoropropane, hexafluoro-2-butene, pentanes or combinations thereof.

10. A polyurethane foam comprising the reaction product of the composition according to claim 6.

11. A method of applying a polyurethane foam comprising the steps of: providing an A-side component comprising polyisocyanate and a B-side component comprising catalyst, surfactant, flame retardant, blowing agent and in major part a polyol component consisting essentially of the aromatic polyester polyol according to claim 1 and essentially free of polyether polyol, preparing a surface on which to apply the foam; reacting the A-side and B-side components; and applying the reacting components to a surface.

12. The method of claim 11 wherein said surface comprises a roof, a structural wall, an insulated cavity, a storage tank or a process vessel.

13. The aromatic polyester polyol of claim 1, wherein the glycerin is a biodiesel recycled crude glycerin.

\* \* \* \* \*